United States Patent
Grice

[11] Patent Number: 5,964,056
[45] Date of Patent: Oct. 12, 1999

[54] GRAPHITE FIBER FISHING ROD BLANK INCORPORATING A NON-WOVEN NON-UNIDIRECTIONAL MATERIAL

[75] Inventor: Steven L. Grice, Spirit Lake, Iowa

[73] Assignee: Berkley Inc., Spirit Lake, Iowa

[21] Appl. No.: 08/842,215

[22] Filed: Apr. 24, 1997

[51] Int. Cl.⁶ ...................................................... A01K 87/00
[52] U.S. Cl. ........................ 43/18.5; 473/319; 428/36.1; 428/36.3; 428/36.4
[58] Field of Search ................................... 43/18.1, 18.5, 43/24, 20, 22, 23; 280/819; 264/314, 136, 137, 257, 277; 428/36.1, 36.3, 36.4, 364; 156/187, 189, 191, 149; 473/316, 319, 320

[56] References Cited

U.S. PATENT DOCUMENTS

| | | | |
|---|---|---|---|
| 2,742,931 | 4/1956 | De Ganahl . | |
| 2,749,643 | 6/1956 | Scott . | |
| 4,178,713 | 12/1979 | Higuchi | 43/18 |
| 4,685,241 | 8/1987 | Foot et al. | 43/18.5 |
| 4,759,147 | 7/1988 | Pirazzini | 43/18.5 |
| 4,885,865 | 12/1989 | Rumbaugh | 43/18.5 |
| 5,028,464 | 7/1991 | Shigetoh | 428/35.9 |
| 5,326,099 | 7/1994 | Yamamoto et al. | 273/80.2 |
| 5,328,742 | 7/1994 | Tukihara | 428/105 |
| 5,385,767 | 1/1995 | Noguchi | 428/36.91 |
| 5,458,372 | 10/1995 | Goode | 280/819 |
| 5,686,155 | 11/1997 | Suzue et al. | 428/34.5 |
| 5,721,030 | 2/1998 | Okada | 428/36.3 |

FOREIGN PATENT DOCUMENTS

| | | |
|---|---|---|
| 433843 | 6/1991 | European Pat. Off. . |
| 51-051482 | 5/1976 | Japan . |
| 56-049253 | 5/1981 | Japan . |
| 4131029 | 5/1992 | Japan . |
| 5184265 | 7/1993 | Japan . |

*Primary Examiner*—Jack W. Lavinder
*Attorney, Agent, or Firm*—Roylance, Abrams, Berdo & Goodman, L.L.P.

[57] ABSTRACT

The present invention provides an improved fishing rod blank having increased hoop strength and a visually unique and appealing appearance. The rod blank of the instant invention incorporates non-woven materials to achieve increased flexibility hoop strength and improved visual appearance. In particular, according to a preferred embodiment of the present invention, non-woven materials are applied to unidirectional prepreg materials during the prepregging process to form a co-plied unidirectional and non-woven preimpregnated fibrous composite material that is used to form the fishing rod blank. In another embodiment, the non-woven material is applied to the outermost layer of the rod in a finishing step to enhance the appearance of the rod. The appearance is further enhanced when the underlying material and a woven outer layer of the blank have contrasting colors. In an alternative embodiment, the innermost layer of the rod blank is formed of a non-woven material. The preferred fibers that make up the non-woven material include kevlar, glass, aramid, polyester and carbon fibers.

4 Claims, 4 Drawing Sheets

GRAPHITE FIBER FISHING ROD BLANK INCORPORATING A NON-WOVEN NON-UNIDIRECTIONAL MATERIAL

FIELD OF THE INVENTION

The present invention relates to graphite fiber fishing rods. In particular, the instant invention is directed to a graphite fiber fishing rod incorporating reinforcing non-woven materials that increase the overall strength, flexibility and durability of the rod, while providing the additional advantage of improved aesthetic appearance.

BACKGROUND OF THE INVENTION

Conventionally, graphite rods, such as, for example, fishing rods, have been made from multiple plies of fibers that are wrapped about a mandrel to form a hollow rod. The plies generally comprise an epoxy or other suitable plastic resin that bonds the fibers together, thereby forming an impregnated cloth that is wrapped about the mandrel. The multiple ply rod is generally cured on the mandrel and then removed to form a lightweight, yet durable, hollow fishing rod blank. Typically, the orientation of the fibers of any given impregnated cloth is in one direction, i.e., unidirectional. The unidirectional impregnated cloth is often referred to as a prepreg sheet.

In order to produce rods having reduced weight and increased strength, the prior art teaches several different arrangements of the fiber plies to achieve the desired results. For example, in U.S. Pat. No. 2,749,643, a rod having an outer layer of longitudinally extending glass fiber is shown. The rod has an inner layer of helically wound glass fibers. The outer fibers serve as tension and compression members to resist bending of the rod. The inner layer of glass fibers is described as resisting crushing to provide the rod blank with adequate hoop strength. The provision of adequate hoop strength is important to keep the spacing of the outer layers uniform from the neutral axis to obtain maximum bending resistance.

When tapered hollow rods were introduced using graphite filaments in the inner helically wound layer, the hoop and crush strength were provided by the wound filaments. The outer plies are formed from a pattern sheet having a right triangular shape having parallel, i.e., unidirectional, fibers that are aligned with the longitudinal edge of the pattern. When the outer ply is positioned with the short side of the triangle positioned at the large diameter end of the mandrel and the mandrel is rolled across the outer ply, the mandrel moves more rapidly across the outer ply than does the remainder of the mandrel so that the fibers at the large diameter end progressively increase their angle with respect to the axis of the mandrel as they approach the exterior of the rod. After curing the wrapped mandrel and consolidation of the plies into an integral laminate, the mandrel is removed and a flexible rod remains.

Another class of materials used to form hollow fishing rod blanks are referred to generally as woven materials. Woven materials include fabrics made of the actual fibers, such as, for example, graphite fiber, themselves, which are woven just as fabric for clothing might be. By definition, fabrication of woven materials includes a weaving step. Woven material, or wovens as they are referred to in the art, may have fibers that are oriented in two or more directions to achieve specific results, as opposed to unidirectional orientation achieved using impregnated cloth.

Recently, another class of materials has been developed using a process wherein fibers are bonded together without requiring a weaving step during fabrication. These materials are generally referred to as non-woven materials, or non-wovens. It will be understood that the fibers that comprise the non-woven material have no particular orientation and are generally made by blowing fibers and fusing, or otherwise bonding, the blown fibers together in an essentially random manner. Non-wovens have many desirable characteristics relating to strength and aesthetic appeal. However, non-wovens have not been used in the manufacture of fishing rods or other graphite rod constructions.

SUMMARY OF THE INVENTION

The present invention is directed to an improved fishing rod construction that provides increased strength and durability and a unique aesthetic appearance. In particular, the present invention provides a fishing rod construction wherein a non-woven material is used in one or more layers of a multilaminate construction to improve flexibility and crush resistance, i.e., hoop strength. In another embodiment, the non-woven material is added as a finishing layer which, when wetted by the underlying resin of the woven or prepreg layer directly underneath it, provides a unique and visually appealing appearance to the finished rod.

Accordingly, it is an object of the present invention to provide an improved fishing rod construction wherein the hoop strength thereof is improved.

It is another object of the present invention to provide an improved fishing rod construction that has an aesthetically unique and appealing appearance.

It is yet another object of the present invention to use non-woven materials to obtain improvement in the flexibility, hoop strength and visual appearance of the finished fishing rod.

As described above, conventional fishing rod constructions use one or both of two types of fiber reinforcement: unidirectional fiber, and woven fiber or fabric. Unidirectional fiber is a type of fiber wherein all the reinforcing fibers are oriented in a single direction. An example of unidirectional fiber is a prepreg sheet. Woven fiber or fabric includes fibers that are oriented in two or more directions, similar to fabric for clothing. Unidirectional and woven fibers may be made from a variety of materials, including carbon, glass and aramid fibers, whose choice is generally dependent upon the design objectives of the rod designer.

A new class of fiber materials has been developed that has properties similar to fabrics, but is not woven. These materials are generally referred to as non-wovens. Non-wovens may be made of a variety of materials, including carbon, glass and aramids, and fiber areal weights. The fiber direction of non-wovens is essentially random. However, a large percentage of the fibers tend to be oriented along one of the primary axes of the material. The areal weight of non-wovens can vary over a wide range, including any range currently found in the fishing rod industry.

When non-wovens are incorporated into a fishing rod blank, they contribute to the properties of the rod in a unique manner. Specifically, two benefits have been identified. First, incorporation of the non-woven material has been found to enhance ovalizing and crush resistance with a far smaller weight increase than that resulting from using other fiber constructions. Second, when a non-woven material is applied to the exterior of the rod, a unique appearance is realized. The unique appearance is enhanced when the fiber of a woven material that is directly beneath the non-woven layer is of a contrasting color to the underlying material of the blank. In a preferred embodiment, the blank is made with unidirectional carbon fiber prepreg, where the outer ply of carbon has a thin layer of non-woven kevlar material added to the outer surface. The resulting finished blank has enhanced flexibility, crush/ovalizing resistance, and an improved visual appearance.

Many different constructions may be used to achieve the advantages of the present invention. Among these alternatives is a construction where the non-woven material is applied during the prepregging process to the unidirectional graphite prepreg, and the resulting prepreg is used in the blank manufacturing process in the conventional way. Another construction is one in which the non-woven material is applied to the outer ply of the rod. Yet another alternative is a rod construction wherein the non-woven material is on the inside of the innermost ply of the rod. Finally, a rod construction in which the non-woven material is preimpregnated with resin and is applied as a separate ply on the inside of the rod, in a middle ply, or as the outside ply of the rod.

These and other objects and their attendant advantages are achieved by the present invention, which provides an improved fishing rod construction, comprising: an inner layer; at least one intermediate layer disposed about the inner layer; and an outer layer disposed about the at least one intermediate layer, wherein at least one of the layers is formed by applying a non-woven material to a unidirectional prepreg to form a co-plied unidirectional and non-woven preimpregnated fibrous composite. In another embodiment, the outer layer is formed of a non-woven material, preferably comprising glass or KEVLAR™ or other aramid filaments surrounding a woven layer having a contrasting color to that of the underlying material. In another alternative embodiment, the innermost layer is formed of a non-woven material or co-plied unidirectional and non-woven preimpregnated fibrous composite.

It is noted that when a non-woven material is applied to a unidirectional prepreg during the layup process, the materials bond together to form a new composite material. The new composite material is referred to in this application as co-plied unidirectional and non-woven preimpregnated fibrous composite.

BRIEF DESCRIPTION OF THE DRAWINGS

The invention will be described in detail herein with reference to the following drawings in which like reference numerals refer to like elements, throughout the various views, and wherein.

DETAILED DESCRIPTION OF THE PREFERRED EMBODIMENTS

The composite of the present invention is a multilayered laminate that includes plies of reinforcing fibers in a resinous matrix comprising approximately 35–45% resinous material and preferably about 40%, and at least one ply of a non-woven material made with compatible reinforcing fibers. The reinforcing fibers used in the composite include graphite, glass, aramid, boron, VECTRAN™, and the like. Suitable resinous matrices that can be used include epoxies, acrylics, and other resins conventionally used to make tubular structures like fishing rods, golf shafts, ski poles, etc. Suitable weights for the composite of the present invention are in the range of 100 to 150 $g/m^2$, and is preferably about 125 $g/m^2$.

The fibrous material used in the non-woven layer should be chosen to be compatible in terms of chemistry and performance with the reinforcing fibers used in the remaining plies in the laminate. Suitable fibers used in the non-woven layer include graphite, glass, aramid, polyester, VECTRAN™, and the like. Non-woven sheetstock made from many of these materials is commercially available in a variety of weights, lengths and thicknesses. Suitable non-woven material weights are within the range from about 0.25 to about 0.5 $oz/yd^2$, and preferably about 0.4 $oz/yd^2$. Suitable lengths for the fibers that make up the non-woven material are within the range of about 0.25 to about 1.0 inches, and preferably about 0.5 inches.

The non-woven material can be used as the innermost ply, an intermediate ply, as the outermost ply (after finishing), or a combination of these. Preferably, the non-woven material is added to the composite inside a sacrificial, outermost layer of glass scrim and allowed to cure under conventional conditions. Once cured, the blank is sanded to provide a smooth outer surface. The glass scrim layer is removed during this surface sanding and allows the non-woven layer to become the outermost ply in the final product.

Non-woven materials of lighter weight can, depending on the fiber, be wetted by the resinous matrix. If the fibers in the non-woven material are made, tinted, dyed, or otherwise colored to contrast with reinforcing fibers used in lower plies, the visual effect can be a uniquely attractive marble-like appearance. The particular color and degree of contrast can be chosen to heighten or subdue the effect. A particularly preferred non-woven weight for achieving the visual effect is within the range of 0.25 to about 0.5 $oz/yd^2$ and colors selected from red, blue, green, yellow, orange, purple, etc.

Figure 1:
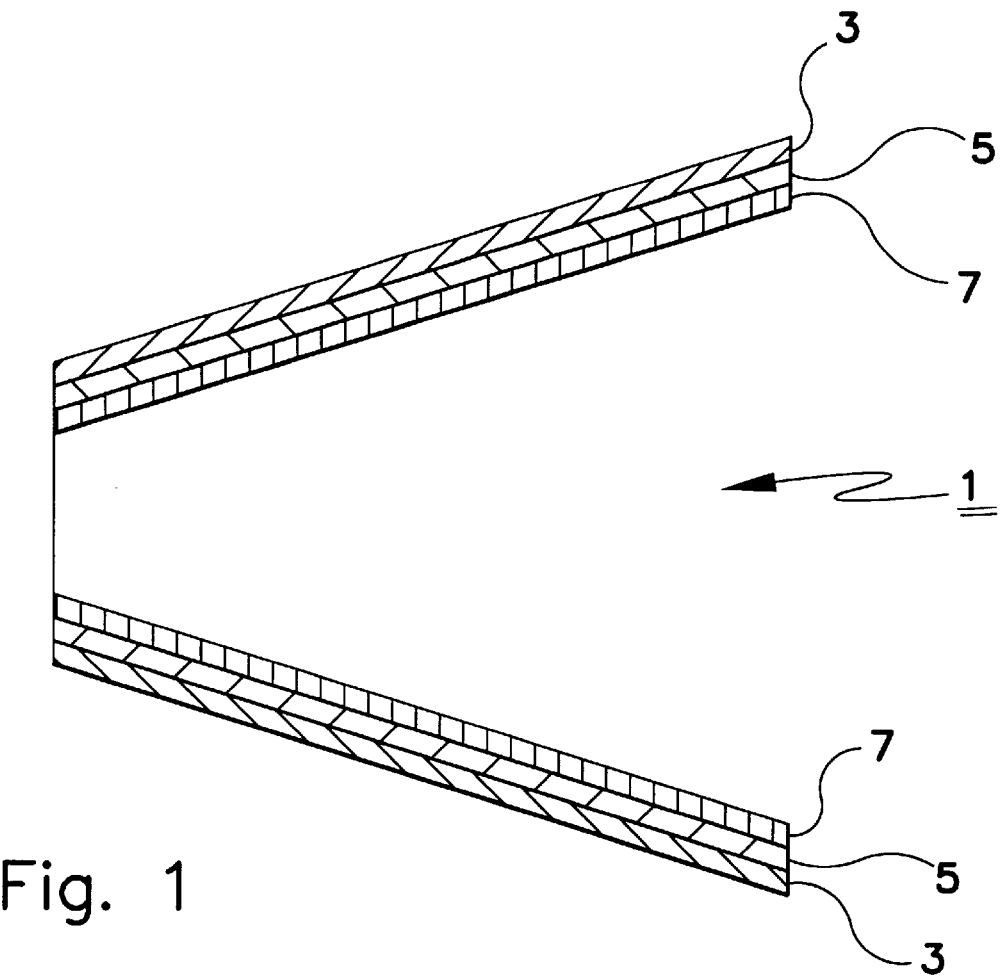
FIG. 1 is a sectional side view of a laminated fishing rod structure in accordance with a preferred embodiment of the present invention.
Figure 2:
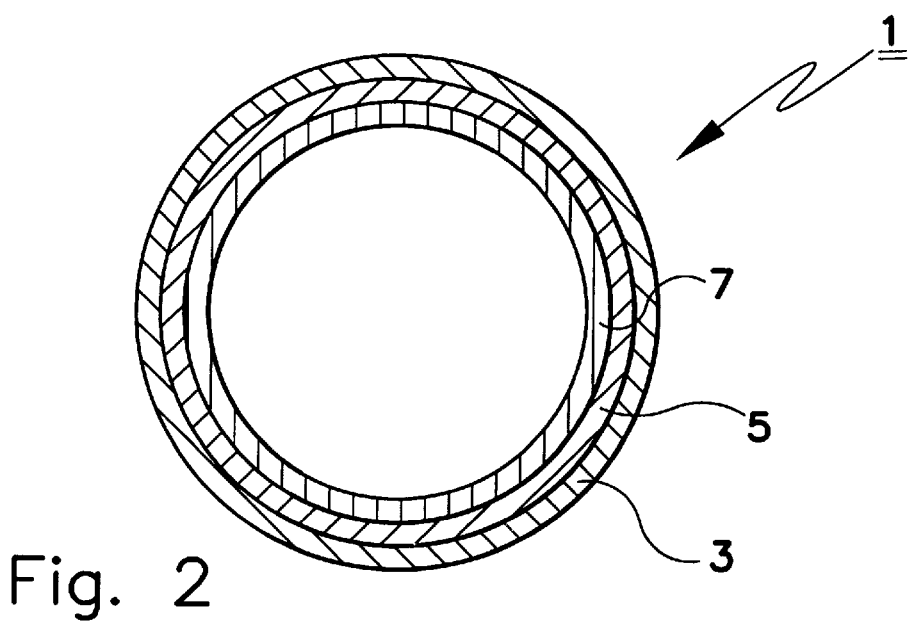
FIG. 2 is a cross-sectional view of the embodiment depicted in FIG. 1.

Referring initially to FIG. 1, a sectional side view of a laminated fishing rod construction 1 of a preferred embodiment of the present invention is shown. The construction shown in FIG. 1 includes an inner layer 7, at least one intermediate layer 5 and an outer layer 3. Conventionally, the layers 3, 5, 7 may be made of either prepreg sheet, a woven fiber material, or any combination thereon as chosen by the designer of the rod 1. According to a preferred embodiment of the present invention, any or all of the layers 3, 5, 7 are made of a composite formed by applying a non-woven material to a unidirectional prepreg during the prepregging process. The resulting composite material is a co-plied unidirectional and non-woven preimpregnated fibrous composite. The composite, thus formed, lends greater crush/ovalizing resistance to the rod, thereby providing increased hoop strength thereto. FIG. 2 shows a cross section of the construction described above with respect to FIG. 1. The non-woven material may be made of any of a variety of known fibrous material, including, for example, kevlar, glass, aramid and carbon, i.e., graphite, fibers.

Figure 3:
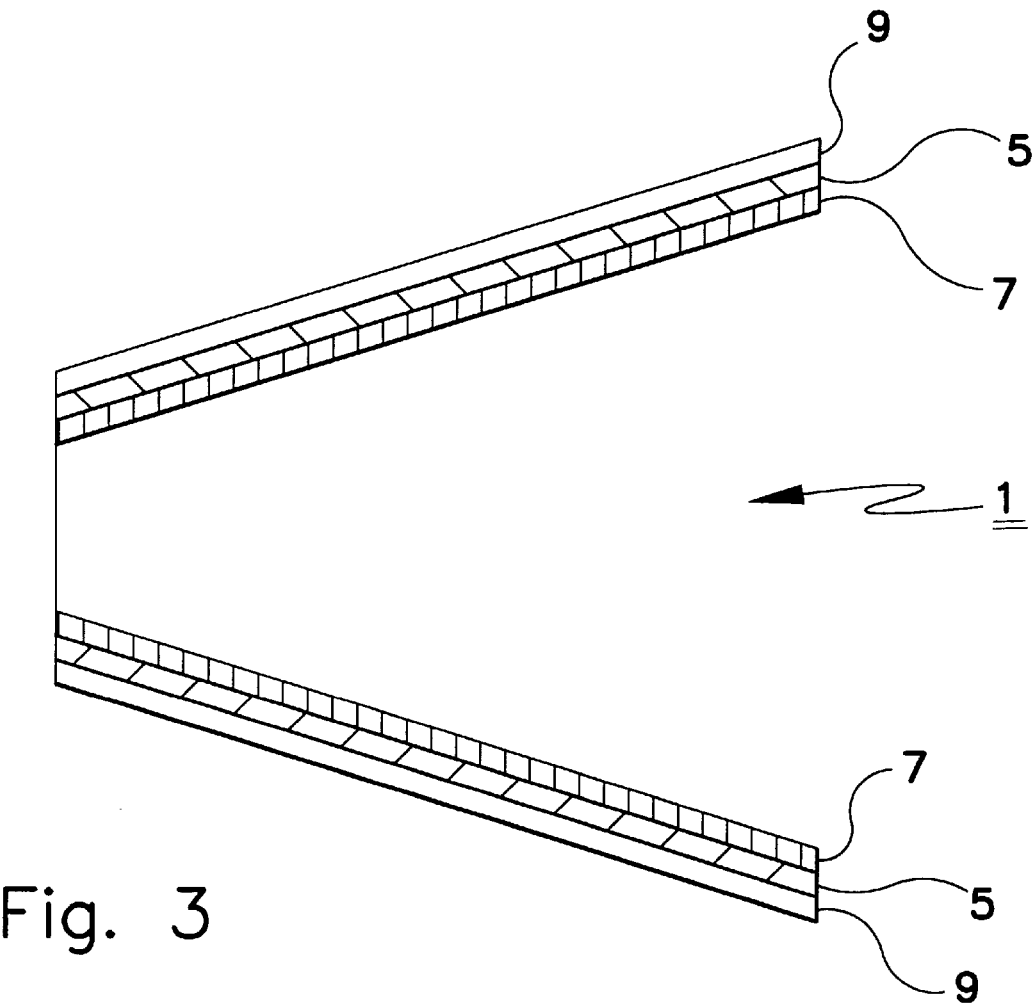
FIG. 3 is a sectional side view of a laminated fishing rod structure in accordance with an alternative embodiment of the present invention.
Figure 4:
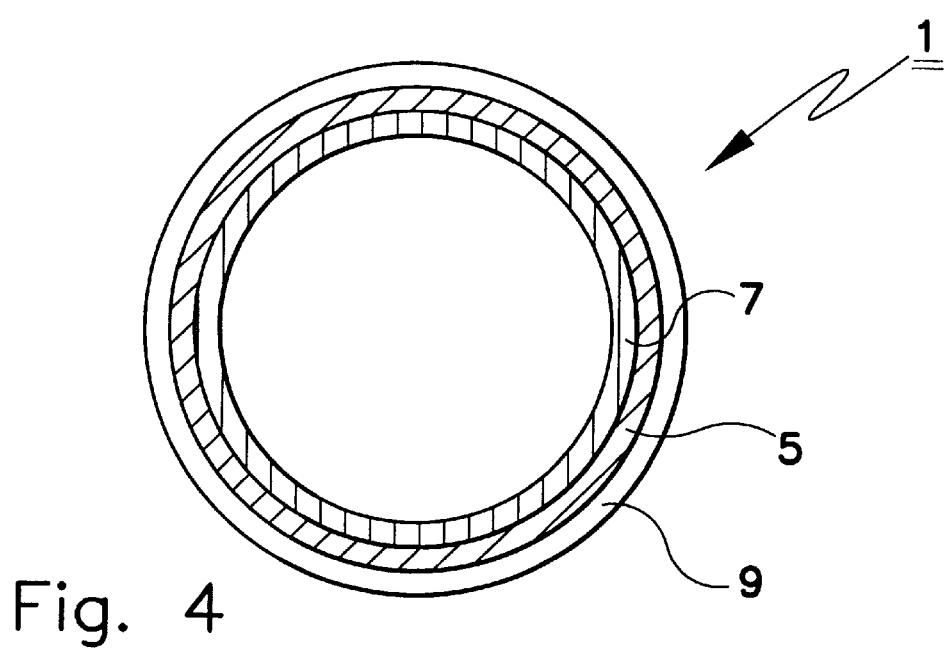
FIG. 4 is a cross-sectional view of the embodiment depicted in FIG. 3.
Figure 7:
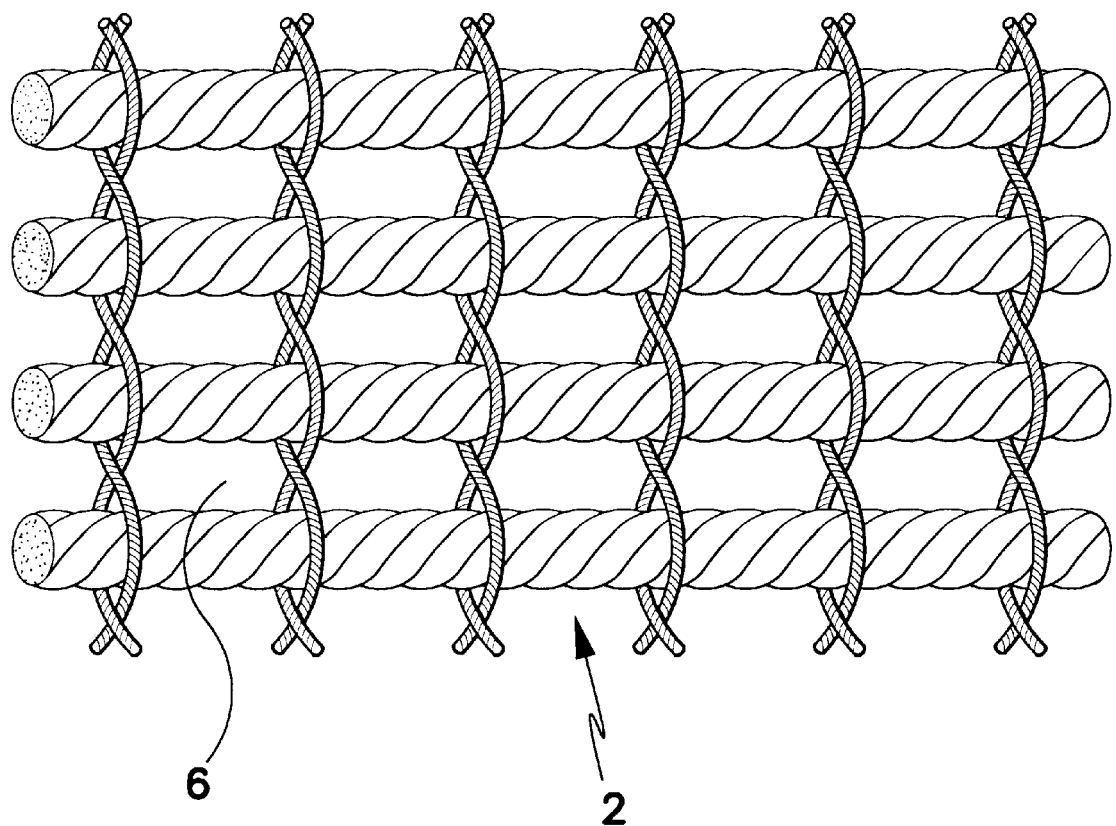
FIG. 7 is an enlarged view of a woven fiber material showing the interstices of the woven material.

In another embodiment of the present invention illustrated in FIGS. 3 and 4, a fishing rod blank 1 includes an inner layer 7, at least one intermediate layer 5, and an outer layer 9 formed by applying a non-woven layer to the outermost of the intermediate layers 5. In order to realize an enhanced visual appearance of the rod, it is preferred that the outermost layer of the at least one intermediate layer 5 be formed of a woven material. The woven material, as shown in enlarged view in FIG. 7, includes woven fibers 2 and interstitial spaces 6 disposed between the woven fibers 2. Typically, when the woven material 5 is applied to the inner layer 7, a bonding resin or epoxy is used. The non-woven outer layer 9 is applied to the woven intermediate layer 5 such that the resin of the intermediate layer 5 wets the non-woven outer layer 9. The effect of the wetting of the non-woven outer layer 9 by the resin of the woven intermediate layer 5 is to produce a translucent non-woven outer layer that highlights the woven layer such that the woven fibers 2 and interstices 6 stand out and are contrasted, thereby producing a highly desirable visual effect. The visual effect is especially enhanced where the fiber 2 of the woven material has a color that contrasts the underlying material 7 of the blank. The inner layer 7 and the innermost of the intermediate layers 5 may be made of unidirectional prepreg, woven fiber and/or co-plied unidirectional and non-woven preimpregnated fibrous composite, depending upon design considerations of the rod designer.

Figures 5, 6:
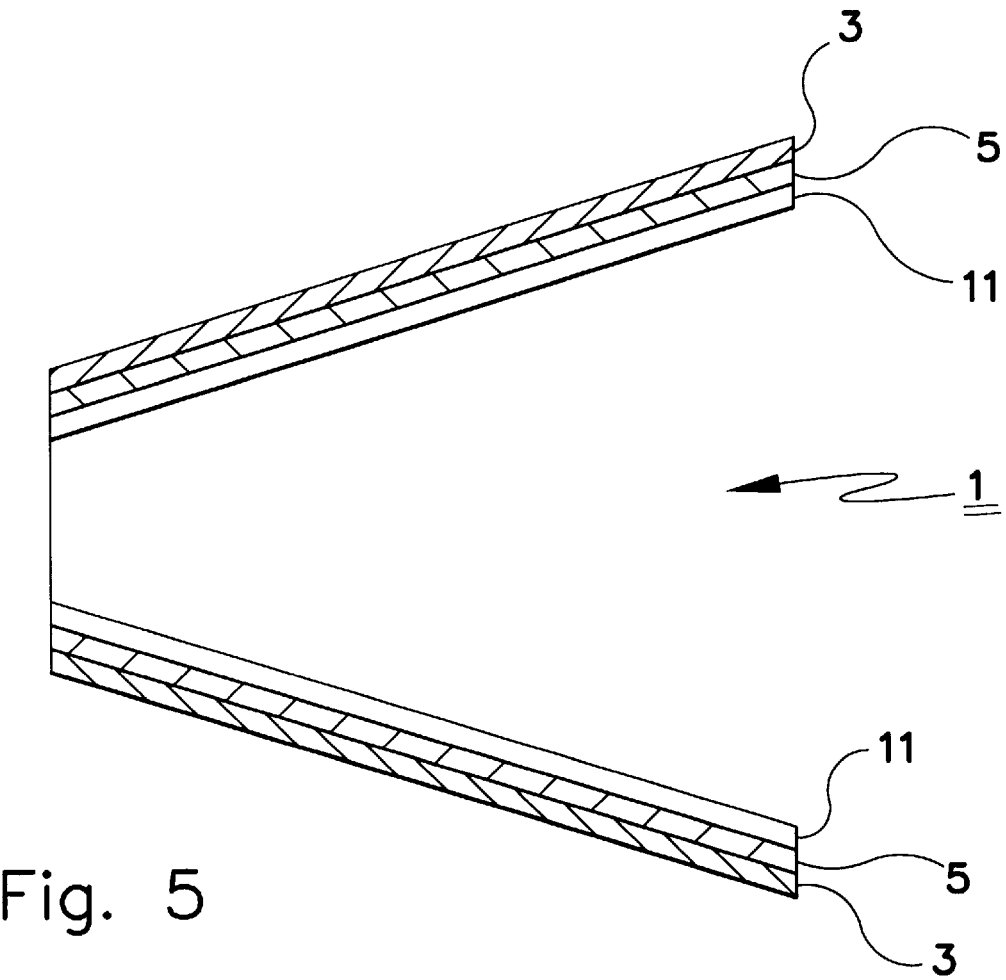
FIG. 5 is a sectional side view of a laminated fishing rod structure in accordance with another alternative embodiment of the present invention.
FIG. 6 is a cross-sectional view of the embodiment depicted in FIG. 5.

In another alternative embodiment shown in FIGS. 5 and 6, the innermost layer 11 of the rod is formed of a non-woven material. The rod is constructed having a non-woven material as the innermost layer 11 thereof. The remaining layers of the rod, e.g., the intermediate layers 5 and the outer layer 3 may be formed of unidirectional prepreg, woven fiber material and/or co-plied unidirectional and non-woven preimpregnated fibrous composite material, as chosen by the rod designer. A fishing rod construction 1 of this type has improved crush and ovalizing resistance, i.e., increased hoop strength.

It will also be understood that in any of the above constructions, the non-woven material may be preimpregnated with resin and applied as a separate ply on the inside of the rod, in a middle or intermediate ply, or as the outside ply of the rod. Depending upon where the preimpregnated non-woven material is applied, greater improvements in hoop strength and aesthetic appearance may be realized. Additionally, it has been found, in the case of co-plied unidirectional and non-woven preimpregnated fibrous composites, that when the unidirectional materials are different from the materials that form the non-woven material, further advantages relating to hoop strength are realized, such as, for example, where the unidirectional material is made of carbon and the non-woven material is made of aramid. It will be understood that any combination, not just the disclosed carbon and aramid combination, may be made, depending upon the desired characteristics of the finished rod blank.

As described above, it will be understood by those of skill in the art that non-woven materials are very different from materials generally used to finish a fishing rod. For example, in conventional fishing rod manufacturing techniques, it is common for an outer layer of glass or plastic to be applied to the rod blank. In a finishing process the glass or plastic is either removed or polished to produce a rod having an acceptable visual appearance. On the other hand, non-woven materials, which may be made of any of a variety of fibrous materials, including, but not limited to glass, aramid and carbon fibers, are formed by blowing fibers of the material and fusing them together in a substantially random orientation to form a non-woven sheet of material. This fundamental difference is one which provides the improved rod characteristics set forth in the present invention.

While the invention has been described in conjunction with specific embodiments thereof it is evident that many alternatives, modifications and variations will be apparent to those skilled in the art. Accordingly, the preferred embodiments of the invention, as set forth herein, are intended to be illustrative, not limiting. Various changes may be made without departing from the true spirit and full scope of the invention, as defined in the following claims.

What is claimed is:

1. A tubular hollow rod construction having a substantially circular cross section, comprising:

an inner layer;

at least one intermediate layer disposed about said inner layer; and an outer layer disposed about an outermost layer of said at least one intermediate layer; said inner layer, said at least one intermediate layer and said outer layer being formed of a co-plied unidirectional and non-woven preimpregnated fibrous composite material.

2. The rod construction of claim 1, wherein a non-woven fibrous component of said co-plied unidirectional and non-woven preimpregnated fibrous composite material is made of at least one fiber selected from the group consisting of: glass, aramid and carbon fibers.

3. The rod construction of claim 2, wherein a unidirectional fibrous component of the co-plied unidirectional and non-woven preimpregnated fibrous composite material is different from the non-woven fibrous component of the co-plied and non-woven preimpregnated fibrous composite material.

4. The rod of claim 1, wherein said rod exhibits the shape of a fishing rod, golf shaft or ski pole.

* * * * *